(12) United States Patent
Nagenkögl et al.

(10) Patent No.: US 6,752,359 B2
(45) Date of Patent: Jun. 22, 2004

(54) DEVICE FOR FLEXIBLY FASTENING A THERMALLY STRESSED COMPONENT

(75) Inventors: Günther Nagenkögl, Steyr (AT); Ewald Hundsberger, Steyr (AT); Rudolf Enzendorfer, Steyr/Gleink (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/195,481

(22) Filed: Jul. 16, 2002

(65) Prior Publication Data
US 2003/0047655 A1 Mar. 13, 2003

(30) Foreign Application Priority Data
Jul. 19, 2001 (AT) .......................... 577/2001 U

(51) Int. Cl.[7] .............................................. F16L 3/00
(52) U.S. Cl. .................. 248/49; 248/609; 248/636; 248/72; 248/73; 248/50; 248/229.54; 248/228.5
(58) Field of Search .................. 248/49, 74.1, 74.4, 248/74.3, 68.1, 562, 609, 636, 214, 219.4, 229.24, 227.4, 227.3, 228.5, 231.81, 55, 916, 228.1, 72, 73, 50

(56) References Cited

U.S. PATENT DOCUMENTS

| | | | |
|---|---|---|---|
| 813,588 A | * | 2/1906 | Rollins |
| 1,062,373 A | * | 5/1913 | Swan |
| 1,110,130 A | * | 9/1914 | Gray |
| 1,193,480 A | * | 8/1916 | O'Day |
| 1,561,850 A | * | 2/1923 | Guttman |
| 2,102,415 A | * | 12/1937 | Herreshoff |
| 2,286,140 A | * | 6/1942 | Klein et al. |
| 3,627,300 A | * | 12/1971 | Caveney et al. ............ 269/131 |
| 3,664,691 A | * | 5/1972 | Nakamura |
| 3,883,929 A | * | 5/1975 | Fortsch ..................... 24/132 R |
| RE29,037 E | * | 11/1976 | Caveney et al. ............ 269/131 |
| 4,029,277 A | * | 6/1977 | Bulanda .................... 248/74.1 |
| 4,079,970 A | * | 3/1978 | Brett ........................ 285/136.1 |
| 4,090,747 A | * | 5/1978 | Jensen |
| 4,118,101 A | * | 10/1978 | Teramachi |
| 4,502,653 A | * | 3/1985 | Curtis, Jr. |
| 4,884,420 A | * | 12/1989 | Finkel et al. |
| 5,906,341 A | * | 5/1999 | Brown |
| 6,173,926 B1 | * | 1/2001 | Elvegaard .................. 248/74.1 |
| 6,364,256 B1 | * | 4/2002 | Neider et al. ................ 248/55 |
| 6,553,634 B2 | * | 4/2003 | Ogawa ........................ 24/339 |

FOREIGN PATENT DOCUMENTS

| | | | | |
|---|---|---|---|---|
| CH | 664430 A | * | 2/1988 | ............. F16L/3/10 |
| DE | 3325092 | | 1/1985 | |
| DE | 4229467 | | 3/1994 | |
| DE | 19548340 C1 | * | 12/1996 | .......... F02M/35/10 |
| EP | 0523383 | | 1/1993 | |

* cited by examiner

*Primary Examiner*—Kimberly Wood
(74) *Attorney, Agent, or Firm*—Dykema Gossett PLLC

(57) ABSTRACT

The invention relates to a device (1) for flexibly fastening a thermally stressed component (2), especially in an internal combustion engine, with a fastening member (12) for receiving the component (2). In order ensure both a secure fastening of the component (2) and a compensation of longitudinal expansions of the component (2) it is provided that the fastening member (12) comprises at least one clamp bracket (4), with at least one rollable intermediate member (5) being disposed between the clamp bracket (4) and the component (2).

11 Claims, 2 Drawing Sheets

DEVICE FOR FLEXIBLY FASTENING A THERMALLY STRESSED COMPONENT

BACKGROUND OF THE INVENTION

The invention relates to a device for flexibly fastening a thermally stressed component, especially in an internal combustion engine, with a fastening member for receiving the component.

Thermally stressed components such as pipes, radiators or the like are subjected to different thermal expansions depending on the temperature. In the case of a rigid fastening, thermal stresses occur especially by longitudinal expansions which could damage the component per se or adjacent parts. It is known to flexibly suspend thermally stressed components such as exhaust pipes by means of elastic rings in order to compensate heat expansions on the one hand and to prevent the transmission of structure-borne noise to the passenger compartment on the other hand. Such fastenings are very susceptible to wear and tear and come with the disadvantage that in the case of failure of the suspension the component is no longer supported.

Such a fastening is out of the question for more complex components such as exhaust gas recirculating coolers.

DESCRIPTION OF THE PRIOR ART

In EP 523 383 A or DE 33 25 092 A solutions have been disclosed in which a sliding connection between individual components is to absorb uneven changes in length. The occurrence of thermally induced tensions cannot be reliably prevented thereby, however.

SUMMARY OF THE INVENTION

It is the object of the present invention to provide a flexible, but still failure-proof fastening for components with which thermally induced longitudinal expansions in the component can be compensated without producing any additional tensions.

This occurs in accordance with the invention in such a way that the fastening member comprises at least one clamp bracket, with at least one rollable intermediate member being disposed between the clamp bracket and the component. The intermediate member is pressed by the clamp bracket against the component. In the case of any occurring longitudinal expansions of the component, the intermediate member rolls off between the component and the clamp bracket, so that longitudinal stresses in the component can be reduced. In order to enable an unhindered rolling off of the intermediate member, the same can be provided with an elastic arrangement.

According to an embodiment that is very simple to manufacture, the intermediate member can be preferably arranged as an O-ring. In order to allow a simple assembly it is provided that the clamp bracket or the component is provided with at least two hook-like projections for receiving the O-ring. For mounting purposes, the O-ring is fixed on the hook-like projections ensuring a rapid and positionally correct installation.

As an alternative to the O-ring, the intermediate member can also be provided with a rod-shaped arrangement.

A favorable damping of the component with respect to the fastening element or the fastening bracket is achieved when the intermediate member is arranged as a gas-filled hollow body.

At medium temperatures the intermediate element can consist of rubber or plastic material. At higher thermal stresses it may be advantageous, however, when the intermediate member is formed by a Bourdon spring.

Concerning the positioning of the intermediate member it is advisable to embed the intermediate member in a groove of the clamp bracket or the component.

In a particularly advantageous embodiment it is provided that the fastening element is provided with two clamp brackets between which the component is clamped. In order to limit the fastening forces acting upon the component it is provided that the two clamp brackets are spaced from each other by spacer elements, preferably by spacer sleeves. The two clamp brackets and the spacer sleeves thus form a kind of fastening frame for the component. The clamp brackets are connected with each other by means of fastening screws which are guided through the spacer sleeves or by means of at least one tightening strap.

The fastening screws on their part are screwed together with a rigid fastening bracket. In the case of a tightening strap, the same is rigidly connected with the fastening bracket.

The invention is especially advantageous for fastening a component which is arranged as an exhaust recirculation cooler of an internal combustion engine.

BRIEF DESCRIPTION OF THE DRAWINGS

The invention is now explained in closer detail by reference to the enclosed drawings, wherein.

DETAILED DESCRIPTION OF THE PREFERRED EMBODIMENTS

Figure 1:
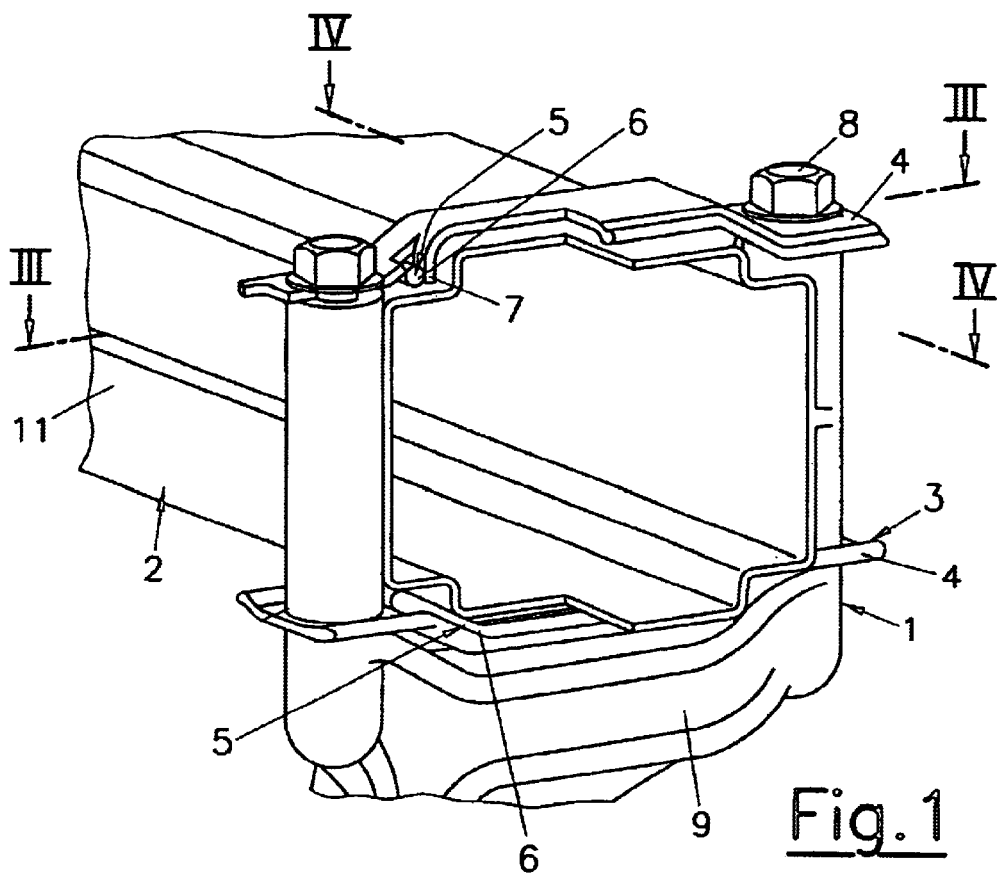
FIG. 1 shows an oblique view of a component fastened with the device in accordance with the invention.
Figure 2:
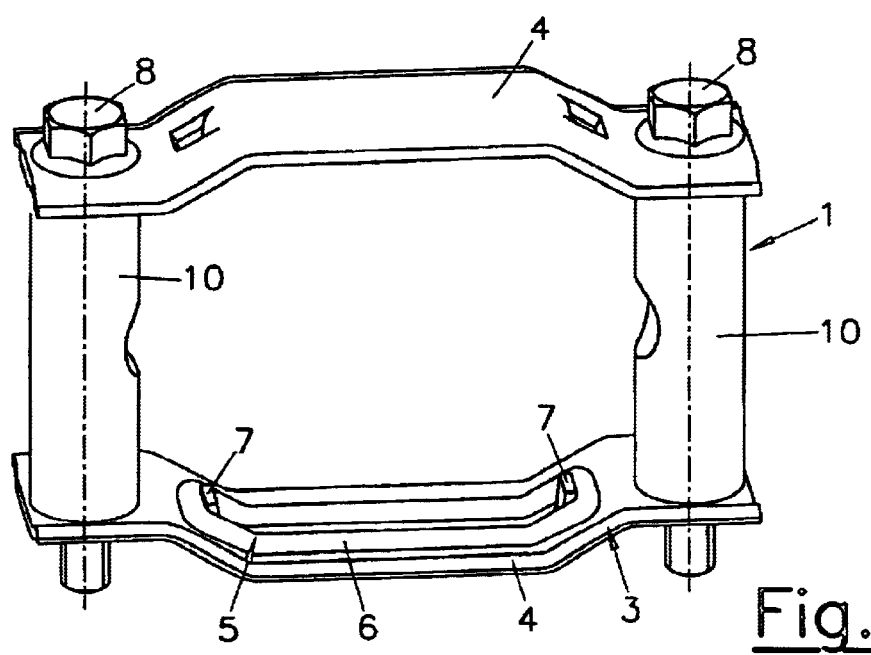
FIG. 2 shows the device itself in an oblique view.
Figure 3:
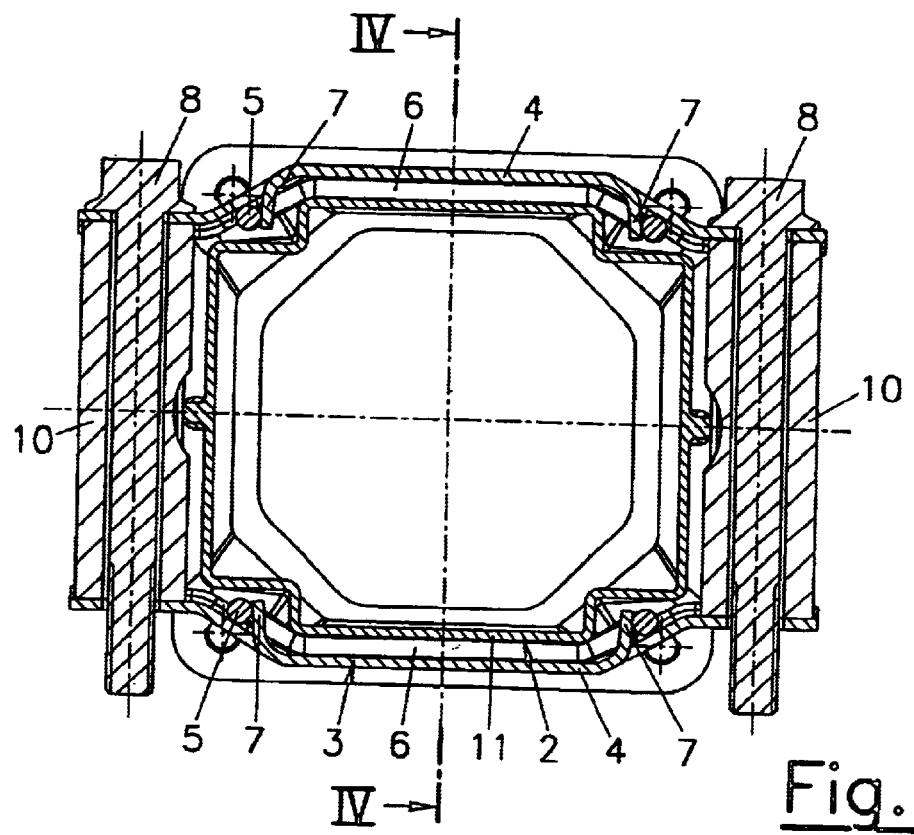
FIG. 3 shows the device in a sectional view along line III—III in FIGS. 1 and 4.
Figure 4:
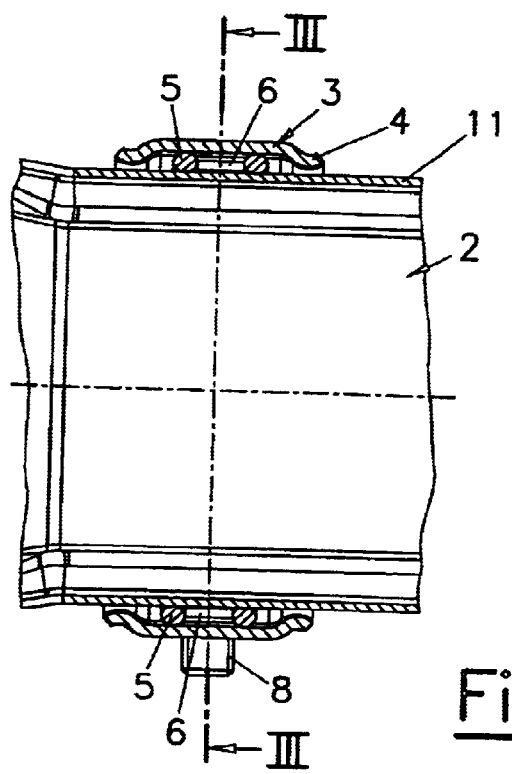
FIG. 4 shows the device in a sectional view along the line IV—IV in FIGS. 1 and 3.

The device 1 for the flexible fastening of a thermally stressed component 2 comprises a fastening element 3 with two similar clamp brackets 4 between which component 2 is clamped. A rollable intermediate member 5 is arranged between the clamp brackets 4 and the component 2, which member is formed by an elastic O-ring 6 made of an elastomeric material. In order to simplify mounting and to fix the position, the O-rings 6 are fixed on hook-like projections 7 of the clamp bracket 4. The projections 7 are formed in the embodiment by punched parts of the clamp brackets 4 formed by sheet metal.

The two clamp brackets 4 are mutually connected by means of fastening screws 8 which are screwed together with a rigid fastening bracket 9 which is fastened fixedly to the housing.

In order to limit the clamping forces acting up the component 2 as a result of the fastening screws 8, spacer sleeves 10 are arranged between the clamp brackets 4 through which the fastening screws 8 are guided.

As an alternative to the fastening screws 8 it is also possible to provide a tightening strap made of steel or plastic for bracing the clamp brackets 4.

The intermediate members 5 are pressed by the clamp brackets 4 against the component 2 which is formed in the embodiment by an exhaust recirculation cooler 11 of an internal combustion engine. In the case of a longitudinal expansion of component 2, which is caused by changes in temperature, the intermediate member 5 rolls off between the component 2 and the clamp bracket 4, with tensions in the component 2 by the longitudinal extension being reduced. Despite the axial mobility of the component 2, a secure fastening of the same on the fastening bracket 9 is ensured.

As an alternative to the O-ring 6, the intermediate part 5 can also be formed by a rod-like element, e.g. by a Bourdon spring.

What is claimed is:

1. A device for flexibly fastening a thermally stressed component, especially in internal combustion engines, including a fastening member for receiving the component, the fastening member including a clamp bracket, and a rollable intermediate member positioned between the clamp bracket and the component, the rollable intermediate member rolls between the component and the clamp bracket to reduce longitudinal stresses in the component, said rollable intermediate member being an elastic ring, and wherein one of the clamp bracket and the component comprises two hook projections for receiving said elastic ring.

2. A device according to claim 1, wherein the intermediate member is formed as an O-ring.

3. A device according to claim 1, wherein the intermediate member is a gas-filled hollow body.

4. A device according to claim 1, wherein the intermediate member is formed by a Bourdon spring.

5. A device according to claim 1, wherein the intermediate member is embedded in a groove of the clamp bracket.

6. A device according to claim 1, wherein the intermediate member is embedded in a groove of the component.

7. A device according to claim 1, wherein the fastening member comprises two clamp brackets between which the component is clamped.

8. A device according to claim 7, wherein the two clamp brackets are spaced from one another by spacer members.

9. A device according to claim 8, wherein the clamp brackets are connected with each other by fastening screws.

10. A device according to claim 9, wherein the fastening screws are screwed together with a rigid fastening bracket.

11. A device according to claim 1, wherein the component is an exhaust recirculation cooler of an internal combustion engine.

* * * * *